United States Patent [19]

Meline

[11] Patent Number: 4,491,021

[45] Date of Patent: Jan. 1, 1985

[54] AXIAL-TORSIONAL EXTENSOMETER

[75] Inventor: Harry R. Meline, Minnetonka, Minn.

[73] Assignee: MTS Systems Corporation, Eden Prairie, Minn.

[21] Appl. No.: 474,700

[22] Filed: Mar. 11, 1983

[51] Int. Cl.³ .............................................. G01B 5/30
[52] U.S. Cl. .................................. 73/767; 33/147 D; 73/794
[58] Field of Search ............ 33/143 L, 147 D, 148 D, 33/DIG. 13; 73/760, 763, 767, 781, 782, 774, 794, 795, 847

[56] References Cited

U.S. PATENT DOCUMENTS

| | | | |
|---|---|---|---|
| 2,663,085 | 12/1953 | Ruge | 33/DIG. 13 |
| 3,402,472 | 9/1968 | Riley | 73/763 X |
| 4,010,640 | 3/1977 | Krieger, Jr. | 33/147 D X |
| 4,160,325 | 7/1979 | DeNicola | 33/148 D |

FOREIGN PATENT DOCUMENTS 0777399 12/1980 U.S.S.R. .............................. 73/760

*Primary Examiner*—Charles A. Ruehl
*Attorney, Agent, or Firm*—Kinney & Lange

[57] ABSTRACT

An extensometer assembly accurately measures axial strain, torsional strain and various combinations of these strains in a specimen on which the extensometer assembly is mounted. The torsional strain measurement is made by measuring angular displacement perpendicular to the longitudinal axis of the specimen with one extensometer at the same time separately measuring the elongation of the specimen with a separate extensometer linked to the torsional measuring extensometer by supports having the necessary degrees of freedom so that readings from the respective extensometers are not subjected to excessive "cross talk", and at the same time torsional movement between the extensometers about an axis perpendicular to the longitudinal axis of the specimen is resisted.

12 Claims, 8 Drawing Figures

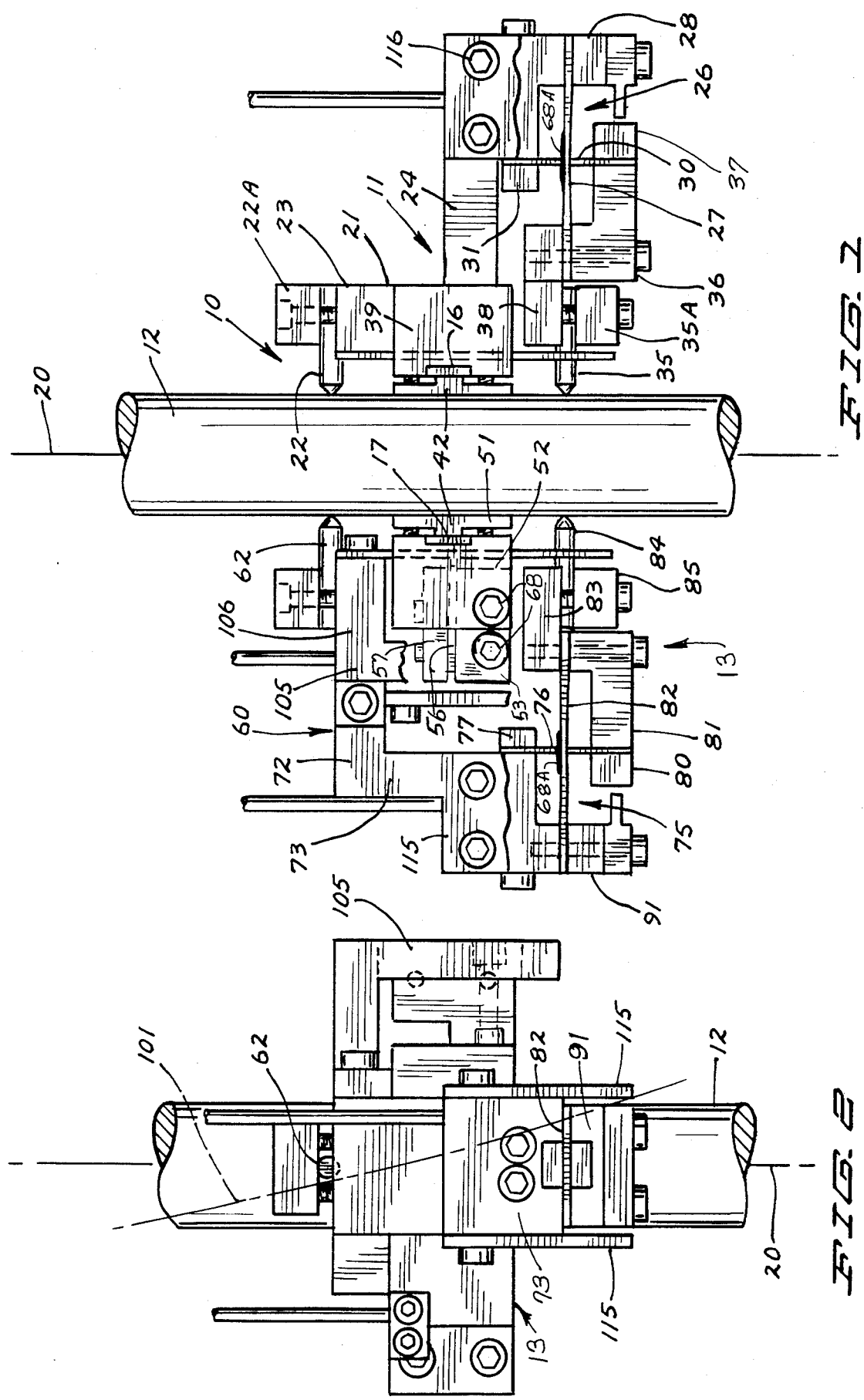

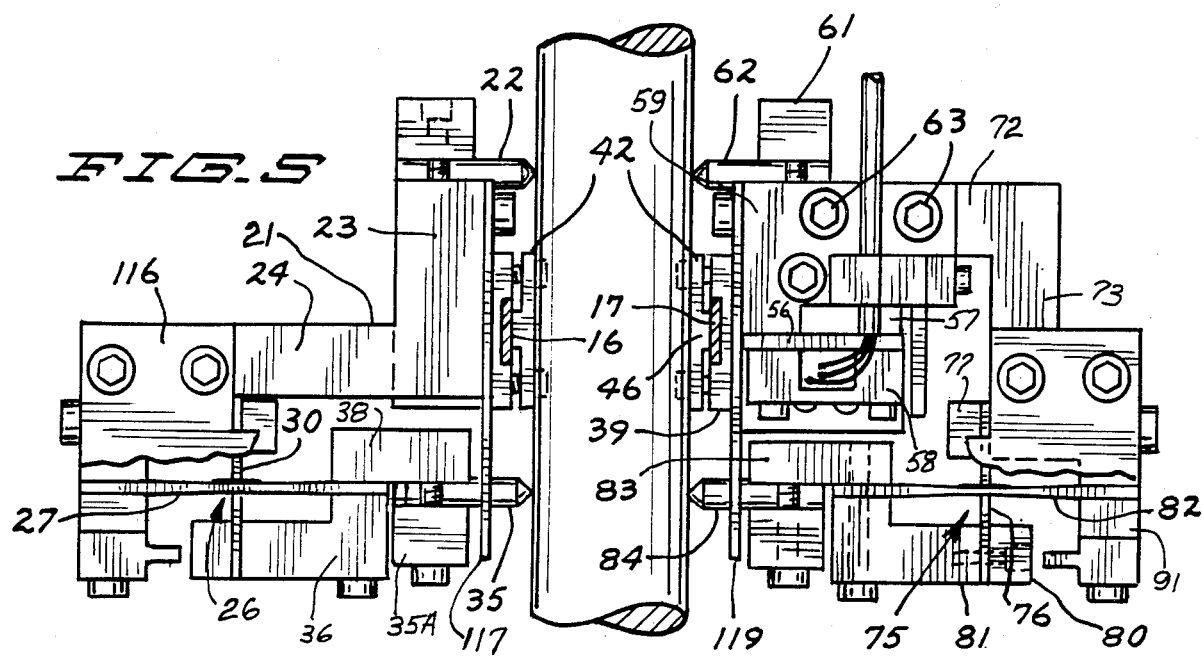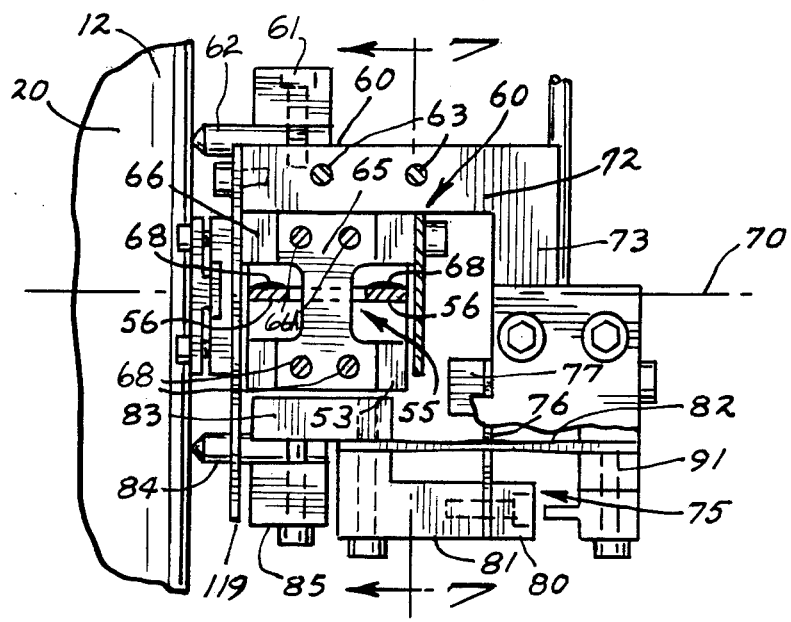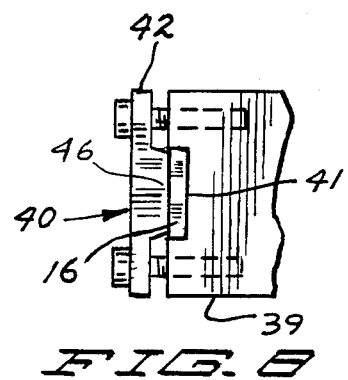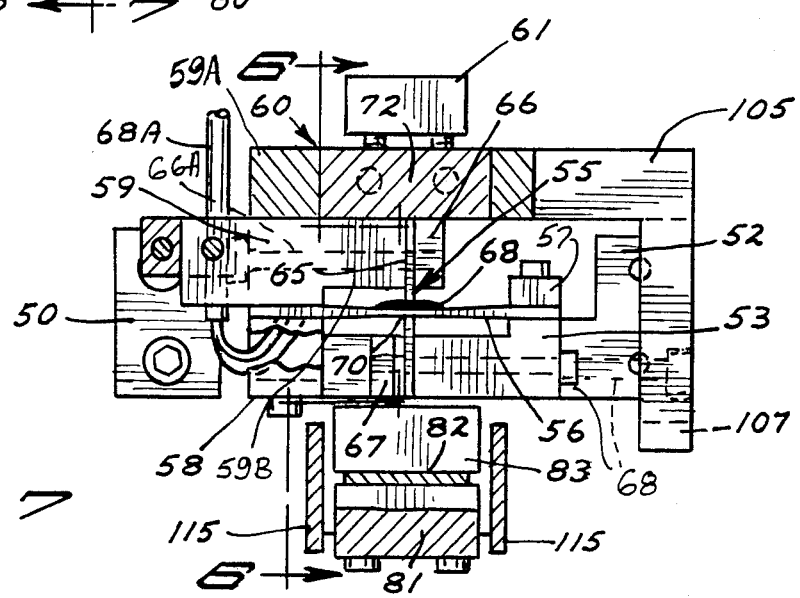

AXIAL-TORSIONAL EXTENSOMETER

BACKGROUND OF THE INVENTION

1. Field of the Invention

The present invention relates to extensometer devices for simultaneously measuring axial and torsional strain in the same specimen.

2. Description of the Prior Art

Various extensometers have been advanced in the prior art. An extensometer which uses a cross flexure mounting for two arm members engaging a specimen and which provides accurate measurements of strain is shown in U.S. Pat. No. 3,789,508. The cross flexure elements supporting the arms of the extensometer have strain gages mounted therein. The arms in turn have suitable knife edges or points which engage the specimen at two axially spaced locations and which are fastened to the specimen. When the specimen to which they are attached is loaded, the arms tend to separate, and the strain gages mounted on the flexure elements measure this strain accurately.

The device shown in U.S. Pat. No. 3,789,508 is designed to measure axial strains only, and not torsional strains.

SUMMARY OF THE INVENTION

The present invention relates to a torsional and axial strain measurement extensometer assembly, that simultaneously measures the axial strain in a specimen, and also the torsional strain to which the specimen is subjected. The extensometer assembly comprises two extensometers. A reference extensometer of substantially conventional design is attached or coupled to the specimen in a normal manner with specimen engaging pins at axially spaced positions on the specimen. The extensometer resists torsional movement between its attachment points to the specimen. The first extensometer is coupled through a unique support arrangement to a second extensometer on a diametrically opposite side of the specimen which has arms which are coupled to engage the specimen at two axially spaced points. The second extensometer is mounted to the support mechanism through a flexure assembly permitting movement about an axis perpendicular to the specimen axis so it will measure the amount of angular movement of a line between the axially spaced attachment points of the second extensometer relative to the reference extensometer, and thus relative to the longitudinal axis of the specimen when the specimen is subjected to strain. The amount of this inclination is measured through the cross flexure mounting arrangement which utilizes strain gages for measuring bending of the cross flexure to indicate angular movement.

A support system couples the two extensometers together and provides the necessary degrees of freedom between the extensometers so that the mounting does not cause "cross talk" but yet is rigid about the axis of torsional strain measurement to insure an accurate measurement relative to the reference extensometer. In other words, the members which couple the two extensometers to each other are compliant in certain degrees of freedom and restrain relative movement about at least one axis.

In testing elongated specimens, the degrees of freedom of the support system that supports one extensometer relative to the other must accommodate the motions normally occurring in testing. One end of the specimen may increase in diameter over the over; both ends of the specimen may increase (or decrease) in diameter; or one side of the specimen may shift in an axial direction in relation to the other side of the specimen.

However, the restraint of the support system does not allow any appreciable amount of torsional movement between the two extensometers about an axis perpendicular to the axial center line of the specimen and extending through the center of the support system.

The two separate extensometers are oriented on diametrically opposite sides of the specimen and are held relative to each other by the support system. The angle measuring cross flexure is used for coupling one of the extensometers to the support system.

BRIEF DESCRIPTION OF THE DRAWINGS

FIG. 1 is a side elevational view of an extensometer assembly made according to the present invention for measuring axial and torsional strain in a specimen with parts broken away;

FIG. 2 is a left side view thereof;

FIG. 5 is a side view of the assembly of FIG. 1 as viewed from a side opposite from the side shown in FIG. 1;

FIG. 6 is a side sectional view taken as on line 6—6 in FIG. 7;

FIG. 7 is a side view of the angle measuring flexure with parts in section and parts broken away; and FIG. 8 is a fragmentary end view of a support member used with the extensometer taken as on line 8—8 in FIG. 3.

DETAILED DESCRIPTION OF THE PREFERRED EMBODIMENT

Figure 3:
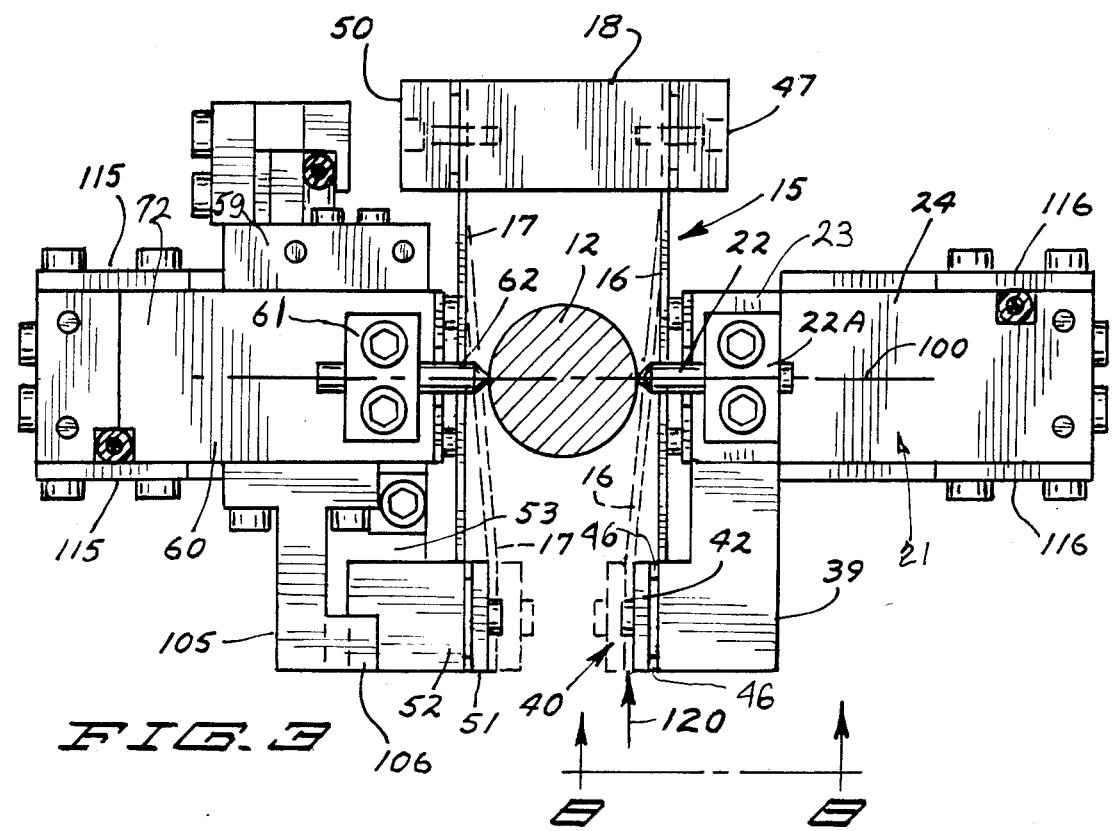
FIG. 3 is a top view of the device of FIG. 1.

Referring to FIG. 1, an extensometer assembly indicated generally at 10 comprises a first extensometer, or extensometer section 11 and a second extensometer or extensometer section 13. Extensometer 11 is mounted on one side of a specimen 12, the strain in which is to be measured, and the second extensometer 13 is mounted diametrically opposite from the first extensometer 11. As shown in FIG. 3, in particular the extensometers 11 and 13 are coupled to each other through a structural flexure support system indicated generally at 15, including a pair of flexure straps 16 and 17. The straps 16 and 17 are held in a mounting block 18 at first ends thereof, and as will be explained, their opposite ends support the respective extensometers 11 and 13 against the specimen under spring load from the straps. This is shown in both FIG. 3, which is the top view, and FIG. 4 which is the bottom view.

The specimen 12 as shown is cylindrical and is adapted to be held in grips at its opposite ends and loaded in a load frame. In particular the specimen is subjected to axial load along its central axis indicated generally at 20. This is the longitudinal axis of the specimen 12 and is the loading axis.

The extensometer 11 is of suitable design, and is operated in a well known manner. It includes a first arm 21 that at its upper end supports a needle point pin 22 the end of which is held in place against the specimen in a suitable manner. The pin 22 is clamped in place on the first arm 21 with a clamp block 22A. The needle point of pin 22 engages the specimen 12 as shown under a desired load against the specimen so that the pin 22 will move with the specimen whenever the specimen elongates.

The arm 21 as shown in FIG. 5 includes a section 23 which extends along one side of and parallel to the specimen 12. An arm portion 24 joins section 23 and extends laterally away from the specimen to an outer mounting end. At the outer mounting end, there is a cross flexure assembly indicated generally at 26 which is a well known design and is explained in the prior art U.S. Pat. No. 3,789,508 previously mentioned. The cross flexure assembly 26 includes a first flexure element 27 clamped to the arm 21 with a suitable block 28. A second cross flexure element 30 is also mounted to arm 21, but inwardly from the block 28. The spring flexure element 30 has a plane that is at right angles to the plane of the first spring flexure element 27. Flexure element 30 is clamped in place at one end with a clamp block 31 in a suitable manner to the arm 21.

Figure 4:
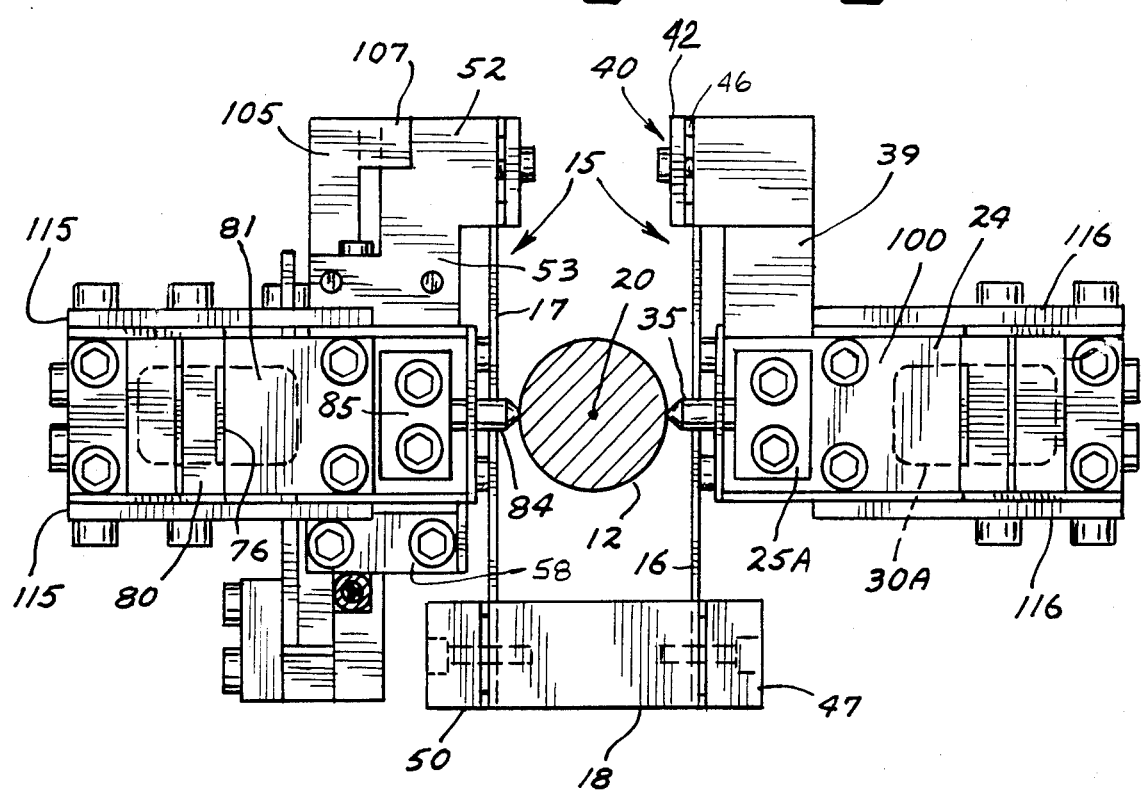
FIG. 4 is a bottom view of the device of FIG. 1.

The flexure element 30 is narrowed in its center so that it will pass through a provided opening 30A shown in dotted lines in FIG. 4 in the center of the flexure element 27. The flexure element 30 is widened out at its outer ends where it is mounted with the block 31. The aperture 30A is of suitable size to permit the spring flexure element 30 to pass through the aperture, as shown and explained in U.S. Pat. No. 3,789,508. The flexure element 27 corresponds to the member 13 in said patent, and the flexure element 30 corresponds to the member 37 in that patent.

The extensometer 11 also includes a second mounting pin 35 having a specimen engaging point and which clips to the specimen in a desired manner. The pin 35 is clamped onto a second arm 36 in a suitable manner with a clamp block 35A. The arm 36 in turn is supported on the two flexure elements 27 and 30 at the ends thereof that are not mounted to the arm 21. The flexure element 30 is clamped to the arm 36 with a mounting block 37, and the end of the flexure element 27 (opposite from block 28) is clamped between two sections of the arm 36, one of which forms a clamp block 38. The cross flexures will permit pivoting about an axis formed along the line at the intersection of the planes of the flexure elements 27 and 30.

It can be seen that the pins 22 and 35 can move in direction along the axis 20 relative to each other, and there is little or no restraint against such movement through the spring flexure elements 27 and 30. The spring flexures are leaf spring members. The flexure elements 27 and 30 are stiff in other directions of movement.

The points of pins 22 and 35 engage the specimen when the arms are clipped to the specimen in the usual manner. For example, as shown in U.S. Pat. No. 3,789,508, the arms can be attached to the specimen with rubber bands that cause the points of the pins to engage the specimen at desired locations. Thus any time the specimen 12 tends to elongate, the flexure elements 27 and 30 will be subjected to bending strain, which strain can be measured with bonded wire strain gages mounted on the flexure elements in the normal manner.

The extensometer assembly as stated includes the second extensometer 13 which is an extensometer which will measure torsion, that is, angular movement of a line between the points that are used for engaging the specimen. The flexural support system for connecting the two extensometers 11 and 13 together is made to provide certain degrees of freedom and also restraint against movement in selected directions. As stated the support system 15 includes a pair of flexure straps 16 and 17. The flexure straps 16 and 17 are spring members having cross sectional configurations such as that shown in FIG. 8. The end of the strap 16 opposite from block 18 is clamped to a laterally extending portion 39 of arm 21 at a location indicated at 40 in FIGS. 3 and 4. The portion 39 has a groove defined therein as shown at 41 in FIG. 8, and a clamping plate 42 is provided to hold the flexure strap 16 tightly clamped in place. The strap 16 fits into the groove and plate 42 has a pair of ribs 46 at opposite ends which bear against the flexure strap 16 along two spaced lines to tightly clamp the strap in place. The clamping plate 42 is fastened in place with suitable cap screws that are threaded into the arm portion 39.

The flexure strap members 16 and 17 both are heat treated spring straps and as will be more fully explained they are initially formed so that at "rest" they form a curve along their longitudinal axis generally corresponding to the deflection curve of a continuous beam cantilevered from opposite ends. The straps have sufficient curvature so that when they are put into place, with the extensometers 11 and 13 mounted on the specimen 12, the straps 16 and 17 will be substantially planar or straight as shown in FIGS. 3 and 4. The generally curved shape is shown in dotted lines in FIG. 3. It can be seen that when the points of pins 22 and 35 are engaged with the specimen 12, the arm portion 39 acts as a cantilever beam because the mounting end indicated at 40 is spaced from the points of pins 22 and 35.

The flexure strap 16 extends across the specimen 12 as shown in FIGS. 3 and 4, and is clamped to the block 18 with a suitable clamp plate 47 made in the same manner as the clamp plate 42, and thus the flexure strap 16 is supported in the block 18 and will carry the same loads as it will at mounting 40 relative to the arm portion 39. The flexure strap 16 is free to bend about an axis parallel to the axis of the specimen 12 as shown in FIGS. 3 and 4, but is rigid in direction along its longitudinal axis, and also resists moments about any axis perpendicular to the plane of the strap.

The opposite end of the block 18 has a clamp plate 50 thereon which clamps one end of the flexure strap 17, comprising a portion of the flexure support 15, between the two extensometers 11 and 13. The flexure strap 17 is constructed the same as the strap 16. The flexure strap 17 extends from the block 18 parallel to the strap 16 as shown and is clamped with a clamp plate 51 to a mounting block 52 for the extensometer 13.

The extensometer 13 is somewhat differently constructed from the extensometer 11 in that the extensometer arm assembly is mounted to the mounting block 52 through flexure elements which permit the extensometer arms to flex or pivot about an axis perpendicular to the specimen axis 20 and positioned midway between the pins 22 and 35 and lying parallel to a plane defined by the line between points of pins 22 and 35 and the longitudinal axis 20 of the specimen 12. This axis is shown in FIG. 7 along the intersection of the flexure elements that mount the second extensometer 13, as will be more fully explained.

The flexure strap 17 as stated extends laterally across the specimen, parallel to the flexure strap 16, and is clamped to the mounting block 52. The clamp plate 51 securely holds the flexure strap 17 in position. The mounting block 52 has an extension arm portion 53 that extends toward the extensometer 13. As perhaps best seen in FIGS. 6 and 7 where parts are broken away, arm portion 53 is configured to permit mounting a cross flexure assembly 55 for supporting the extensometer 13. This cross flexure assembly is made so that it will permit free flexing movement of the extensometer about an axis perpendicular to the axis 20 along a line where the planes of the cross flexure elements intersect. The cross flexure assembly 55 include a first flexure element 56, which is clamped with a suitable clamp block 57 to the top surface of the extension arm 53. The arm 53 is wider at the region where flexure element 56 is mounted. Thus the arm 53 is not uniform size or cross section along its length. The other end of the flexure element 56 (which is a flexure element that has a central opening in it) is clamped with a suitable clamp block 58 to a surface on a support block 59 that mounts and is fastened to be integral with a main arm 60 of extensometer 13. The arm 60 has a pin 62 mounted thereon that has a point that engages the specimen 12 and provides one of the reference points for the extensometer 13. The pin 62 is mounted with a clamp block 61 on the top of the arm 60 and thus is also mounted to block 59. The pin 62 is suitably held against the specimen to permit the extensometer to operate. The block 59 has an upper flange 59A clamped to arm 60 with cap screws 63 shown in section in FIG. 6.

A second flexure element 65 for the flexure assembly 55 used for angle (torsion) measurement has one end clamped with a suitable clamp block 66 to a portion 59B of the block 59 that fits directly below the arm 60. It can be seen that the clamp block 66 is suitably held in place with cap screws 66A that thread into the block 66 to secure the flexure element 65 in position (see FIGS. 6 and 7). The flexure element 65 passes through the central opening of the flexure element 56 (see FIG. 6) and its opposite end is clamped to the support arm 53 with a clamp block 67 (FIG. 7). The clamp block 67 is also secured tightly in place with cap screws 68 which thread into the clamp block 67. A cross flexure support for the extensometer 13 is therefore formed between the support arm 53 and the support block 59 (and arm 60) which permits free and easy movement about the axis formed at the intersection of the planes of the flexure elements 56 and 65. This axis is indicated at 70 in FIGS. 6 and 7 and is perpendicular to the planes of the flexure straps 16 and 17. The axis 70 also is perpendicular to the axis 20 of specimen 12.

Thus it can be seen that the extensometer support and connecting structure, namely the flexure straps 16 and 17 and block 18, transfer forces between the first extensometer 11 and the second extensometer assembly 13 only through the cross flexure assembly 55 comprising flexure elements 56 and 65.

The arm 60 includes a horizontal section 72 which extends outwardly from the specimen and which supports a downwardly extending leg 73 spaced outwardly from the cross flexure 55. The leg 73 in turn is used for supporting a second arm of extensometer 13 and a second specimen engaging pin through a cross flexure assembly indicated generally at 75. The cross flexure assembly again includes a pair of flexure spring elements which support a second specimen engaging pin. The cross flexure includes a spring flexure element 76 which is clamped with a clamp block 77 to the downwardly depending leg 73, and which extends vertically downwardly. The flexure element 76 is a flat spring that has a plane generally parallel to the axis 20 of the specimen, and also parallel to the planes of the flexure straps 16 and 17.

The opposite end of the flexure element 76 is clamped with a suitable clamp block 80 to a support arm 81 using cap screws. One end of a second spring flexure element 82 is clamped with a support block 83 to a portion of arm 81. The lock 83 supports a second specimen engaging pin 84 having a point that engages specimen 12 to provide the second connection or coupling to the specimen for the second extensometer 13. The pin 84 is clamped in place on the block 83 with a suitable clamp block 85. The second flexure element 76 is a flat spring, which passes through an opening in the element 82 (the spring 82 has side members that straddle the member 76 in the conventional manner) and the opposite end of element 82 is clamped with a clamp block 91 to a lug formed at the lower end of the leg 73. The clamp block 91 is held in place with suitable cap screws on the leg 73.

The flexure elements 76 and 82 thus provide a flexure pivot axis along the line where the planes of the flexure elements 76 and 82 cross to permit the arm 81 and pin 84 to move in direction parallel to the axis 20 of the specimen 12 relative to the upper pin 62 when the pins are engaging the specimen 12. At the same time, at a reference position, the line between the points of pins 62 and 84 lies along a common plane with the line between pins 22 and 35 of the first extensometer and the central axis 20 of the specimen.

This plane is shown in FIGS. 3 and 4, at 100. As will be explained, however, the line between the points of pins 62 and 84 will incline relative to plane 100 if there is torsion on the specimen 12 which would cause the pin 62 to rotate relative to the pins of the reference extensometer 11. This rotational movement is permitted because the flexure assembly 55, comprising the flexure elements 56 and 65, is the sole connection between the extensometer engaging pins 62 and 84 of the second extensometer 13 and the first extensometer 11. The connection between the extensometers is through the support assembly including the flexure straps 16 and 17 and block 18.

Suitable strain gages such as those shown at 68 on element 56 are mounted on desired ones of the flexure elements so that as the flexure elements bend, caused by torsion in the specimen 12, a signal is provided indicating torsion loading of the specimen. The strain gages such as 68 on element 56 provide a means for determining the angle of flex and this in turn is a means for indicating the torsional strain as well as the angle of movement. The flexure elements used for joining the arms of the extensometers 11 and 13 also have strain gages mounted thereon. Under torsional strain for example, the line between the points of pins 62 and 84 would incline and an exaggerated dotted line position is indicated 101 in FIG. 2. The stresses in the flexure elements 56 and 65 will be measured by the strain gages and conventional instruments coupled to the gages, and the signal will be a measure of torsional strain in specimen 12. The dotted line position 101 is exaggerated for illustrative purposes, but the flexure elements 56 and 65 and the strain gages mounted thereon will measure very precisely any torsional movement of the specimen 12.

The extensometer arms 60 and 81 supporting the pins 62 and 84 move as a unit about the axis 70 formed where flexure elements 56 and 65 cross. The arms supporting pins 62 and 84 also can flex in directions along axis 20 about the flexure axis formed where flexure elements 76 and 82 cross. The flexure elements 76 and 82 are rigid in relation to loads tending to "skew" the pins 62 and 84 relative to each other.

The amount of flexing or movement about axis 70, which is the torsion measuring axis, is limited by a stop arm 105 that has stop lugs 106 and 107 positioned above and below the mounting block 52 which is the main support for the extensometer 13. The arm 105 is fastened to arm 60 and thus moves relative to block 52 as the extensometer 13 flexes about axis 70.

In the drawings, and in particular FIG. 2, the edges of shielding or cover plates, such as plates 115 for extensometer 13 are shown. These plates 115 are broken away in other views. The cover plates 116 for extensometer 11 are partially broken away in FIGS. 1 and 5. Plates 117 and 119 are mounted on the upper extensometer arms of extensometer 11 and 13 and the pins 35 and 84 extend through slots in these plates. The plates 117 and 119 act as over-travel stops for the pins. The slots in the plates 117 and 119 for pins 35 and 84 are of length to limit separation of the extensometer pins and prevent overstressing of the flexures used for mounting the extensometer arms.

Proper operation requires that there are no undue loads placed on the extensometer 13 relative to the extensometer 11. An analysis of the connecting structure 15 is thus important. For example, if one end of the specimen 12 increases relative to the other, that would mean that the pins 62 and 22 (see FIG. 1) may move apart more than the pins 35 and 84, which are diametrically opposed. The movement in this manner causes the flexure straps 16 and 17 to twist, and does not cause any significant loading of the cross flexure assembly 55 comprising flexure elements 56 and 65 of which measure any change in angle of the line between the points 62 and 84 and thus torsion, nor will the straps 16 and 17 resist elongation of the specimen, which is the separation of the pins on the two extensometers.

Likewise, if both ends of the specimen increase or decrease in diameter under loading, the net result is merely a bending of the flexure straps 16 and 17. The straps 16 and 17 bend easily so that they do not tend to cause any false reading or indication of strain in specimen 12. If one side of the specimen 12 shifted relative to each other, that is the points of pins 22 and 35 remain spaced the same amount, but shifted downwardly relative to the points of pins 62 and 84, the flexure straps 16 and 17 will accommodate this movement because the block 18 will twist the spring straps slightly and will not unduly load the extensometers 11 or 13 through the support members.

However, the connection or support assembly 15 is very rigid in relation to resisting torsion about the axis 70. In other words, any loads on arm 53 and mounting block 52 because of torsion in specimen 12 about axis 70 will be rigidly resisted by straps 16 and 17. The straps 16 and 17 are mounted at their ends through the plates 42 and clamping ribs 46, which will tend to eliminate slipping. The straps 16 and 17 have a great deal of rigidity to resist this torsional loading. Therefore any movement caused by torsion loading of the specimen will be through the flexure elements 56 and 65 and will be measured by the strain gage 68 on such flexure elements. The rigidity of the support structure for the extensometers 11 and 13 in relation to this torsional loading provides a reference between the extensometer 11 and the extensometer 13 through the angle measuring flexure elements 56 and 65. It is important that the straps 16 and 17 do not flex from torsional loading of the pins 62 and 84 in order to accurately measure the actual torsion loading of the specimen.

The flexure straps 16 and 17 are prebent so that at rest they assume a curve that approximates the deflection curve for a beam cantilevered from each end. The points of pins 62, 84, and 22, 35 must be spread apart to be placed on the specimen 12 and when the extensometers are in place on the specimen, the straps become straight and planar beams. When the straps are straight they form a stable column, with less cross talk on the mounting flexure elements, which couple the specimen engaging pins together. The straps 16 and 17 are springs which provide sufficient load on the points of pins 22, 35, 62 and 84 to couple the pins to the specimen for use. No separate clips are needed to hold the extensometer on the specimen. Also, when the straps 16 and 17 are deflected to be straight, a line from the points 22, 35 and a line from points 62, 84, respectively, lie as close as practical to the central plane of the respective strap.

The parallel flexure attachment system is designed such that the member flexure straps are prebent. The prebent flexure straps are formed such that their initial undeflected shape is similar to the shape of an initially straight beam which is deflected by a similar free body loading. This allows the flexure straps to be bent straight when the extensometer assembly is clamped to the test specimen. The flexure straps are then deflected and exerting a spring load on the pins of the extensometer against the specimen. The flexure straps are then most resistant to any cross axis forces and moments which might be generated during use of the extensometer. These cross axis forces and moments have the least disturbance (the straps have the best stability) into the measuring axes when the flexure straps are straight.

Again, if there is a shift in axial direction of the extensometer assemblies 11 and 13 on the specimen, the end block 18 keeps the ends of the straps 16 and 17 with the same slope, and a slight twist of the straps 16 and 17 is accommodated without any substantial effect on the torsion measurements of the specimen. The use of the extensometer assembly on different diameter specimens can be accommodated by changing the block 18 to provide proper spacing of the straps 16 and 17.

Further, the use of the two extensometers on diametrially opposite sides of a specimen and with the support structure that provides for rigidity in relative torsional movement between the two coupling the extensometer together, the arrangement can be used for measuring bending of the specimen 12 in that the spacing along the axis 20 between the mounting points of the extensometers on opposite sides of the specimen can be independently measured. In other words, the change in spacing between the points of mounting pins 22 and 35 can be measured with strain gages on elements 27 and 30, and also a change in spacing between the points of mounting pins 62 and 84 can be made by the strain gages on the cross flexure elements 76 and 82. In this manner it can be determined whether or not the specimen 12 remains straight.

The coupling or mounting structure 15 is very rigid about the same axis in which the angle measurement is to be taking place, that is, axis 70 perpendicular to the axis 20 of the specimen 12 and lying along a reference plane defined by the axis of the specimen and the line between the points of pins 22 and 35. Again, at zero torsional strain on the specimen 12, the line between the points of pins 62 and 84 will also lie along that same plane.

Although the present invention has been described with reference to preferred embodiments, workers skilled in the art will recognize that changes may be made in form and detail without departing from the spirit and scope of the invention.

What is claimed is:

1. An extensometer assembly for measuring axial and torsional loading of an elongated specimen comprising:

a first extensometer having two specimen-engaging point members coupled to the specimen and adapted to measure elongation of a specimen to be tested between two first reference points defining a line for measurement substantially parallel to the longitudinal axis of such specimen and with one of the reference points and the axis providing a reference plane;

a second extensometer having a second pair of point members engaging such specimen at substantially diametrically opposed points from the first reference points, and at a reference position the second points defining a second line lying generally parallel to the axis of such specimen;

a support structure connected to said first extensometer and joined to said second extensometer without contact to such specimen, said support structure including a mounting block spaced laterally from such specimen and spanning such specimen, and separate spring strap means connected from the first extensometer to said mounting block and from said mounting block to said second extensometer for supporting the extensometers relative to the mounting block and to each other and permitting flexure in desired degrees of freedom of the second extensometer relative to the first extensometer;

a flexing pivot assembly located between the support structure and portions of the second extensometer, said flexing pivot assembly permitting movement of a portion of the second extensometer relative to the support structure to permit the second line to shift relative to the line between the first specimen engaging point members of the first extensometer when such specimen is subjected to torsion loading about its longitudinal axis; and means to provide an indication of the relative movement between the second line and the line between the first reference points under torsional loading of the specimen.

2. The apparatus of claim 1 wherein said separate spring strap means are on opposite sides of a specimen to be tested, and have substantially parallel planes when installed on a specimen, and lie generally perpendicular to the reference plane, said spring strap means being mounted at their first ends to said mounting block, and the first and second extensometers each having mounting portions extending to the opposite side of said specimen from said mounting block substantially the same distance as the distance from the specimen axis to the mounting block, and said mounting portions being connected to the respective opposite ends of said spring straps.

3. The apparatus of claim 2 wherein said spring strap means are preformed to have a desired curve along their longitudinal length other than planar before the extensometers supported thereon are mounted on a specimen, and said spring strap means being bent to become substantially planar when the extensometers are mounted on such specimen to exert a load to couple the extensometer points to such specimen.

4. The apparatus of claim 1 wherein said first extensometer includes second flexible elements mounting the first points relative to each other to permit a change in spacing between the first points of the first extensometer along the axis of a specimen to be tested under loads in axial direction of such specimen.

5. An extensometer for measuring torsional loading of an elongated specimen comprising an extensometer having a pair of specimen engaging members adapted to be coupled to a specimen at spaced locations along the longitudial axis of such specimen;

a support block spaced laterally from the specimen engaging members;

means to mount the extensometer to the support block comprising an assembly that permits pivotal movement about a pivot axis generally perpendicular to the longitudinal axis of such a specimen, and substantially midway between the specimen engaging members; and support means including means for establishing a reference plane relative to a loading axis of a specimen with which the extensometer is used on a side of such specimen opposite from the specimen engaging members and for supporting the support block, and the support means including means for coupling the support block to the extensometer to permit movement between the support block and extensometer about the pivot axis perpendicular to the axis of the specimen on which the extensometer is mounted when a specimen to be tested is subjected to torsion loading about its longitudinal axis.

6. The apparatus of claim 5 wherein said support means further includes a pair of spring straps on opposite sides of a specimen on which the extensometer is mounted, and having parallel planes and lying generally perpendicular to the pivot axis, said spring straps being mounted at their first ends to a mounting block, a first strap having its other end connected to the means to establish a reference plane and a second of said straps having its other end connected to the support block.

7. The apparatus of claim 6 wherein the spring straps extend laterally of the specimen engaging members substantially an equal distance in each direction from the specimen engaging members.

8. The apparatus of claim 7 wherein said spring straps are preformed to have a desired shape other than planar before the extensometer is mounted on a specimen, and to be loaded to become substantially planar when the extensometer is mounted on a specimen to exert a load to couple the specimen engaging members to the specimen.

9. The apparatus of claim 5 wherein the means coupling the support block to the extensometer comprises a cross flexure support system between said extensometer and said support block comprising a pair of flat spring elements arranged at right angles to each other, first ends of both elements being supported on the support block and second ends of both elements being supported on the extensometer to permit substantially free movement about the pivot which is formed along the line of intersection between the planes of the elements.

10. The apparatus of claim 5 and means to permit changes in spacing between the specimen engaging members of the extensometer along the axis of a specimen being measured, comprising cross flexure elements which are stressed in bending when such spacing changes.

11. An extensometer assembly for measuring axial and torsional loading of an elongated specimen comprising a first extensometer adapted to be coupled to a specimen and to measure elongation of such specimen between two spaced locations along the longitudinal axis of the specimen which comprises a loading axis;
- a second extensometer having means adapted to engage the same specimen on an opposite side of such specimen from the first extensometer;
- a support structure connected to said first extensometer, and joined to said second extensometer without contact to a specimen on which the extensometers are mounted;
- a pivot assembly coupling the second extensometer to the support structure to permit substantially unrestrained pivotal movement of the second extensometer about a pivot axis perpendicular to the loading axis and midway between the means on the second extensometer to engage the specimen; and
- the support structure being rigid to resist deflections from loads causing movements of the first extensometer about the pivot axis and compliant to permit movement in substantially all other degrees of freedom.

12. An extensometer assembly for measuring axial and torsional strains of a specimen comprising:
- a first extensometer having a frame and a pair of spaced arms movably mounted on the frame for movement relative to each other, each arm having a specimen engaging member mounted thereon;
- a second extensometer having a frame carrying separate second specimen engaging members;
- a support structure connected between said first and second extensometers to support the extensometers on a specimen to be tested with the respective specimen engaging members substantially directly aligned on opposite sides of such specimen, the support structure including a rigid, fixed length mounting block extending in direction between the extensometers and spaced laterally from the extensometers and from such a specimen and spanning such specimen, first spring strap means connected from the first extensometer to said mounting block, and second spring strap means connected from said mounting block to said second extensometer, the spring strap means providing a spring load tending to urge the specimen engaging members of the extensometers against the specimen to be tested to thereby support the extensometers and the support structure on the specimen without any additional external support;
- the specimen engaging members of the first extensometer engaging the specimen at spaced points defining a first line, and being movable along such line as a specimen on which the extensometers are mounted is loaded in direction along a loading axis of said specimen;
- the specimen engaging members of said second extensometer engaging a specimen to be tested at spaced apart points defining a second line extending generally in the direction of the loading axis; and
- pivot means for supporting at least portions of the second extensometer relative to the first extensometer to permit the second line to shift in relative position with respect to the first line when a specimen on which the extensometers is mounted is subjected to torsional loading about its loading axis.

* * * * *